W. H. YERKES.
SLED.
APPLICATION FILED MAY 22, 1920.
1,349,645.
Patented Aug. 17, 1920.
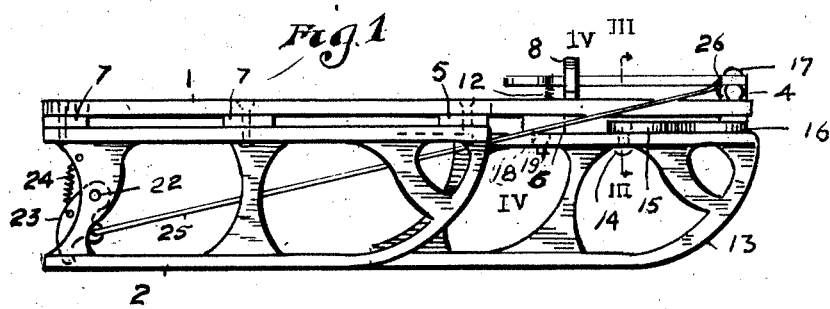
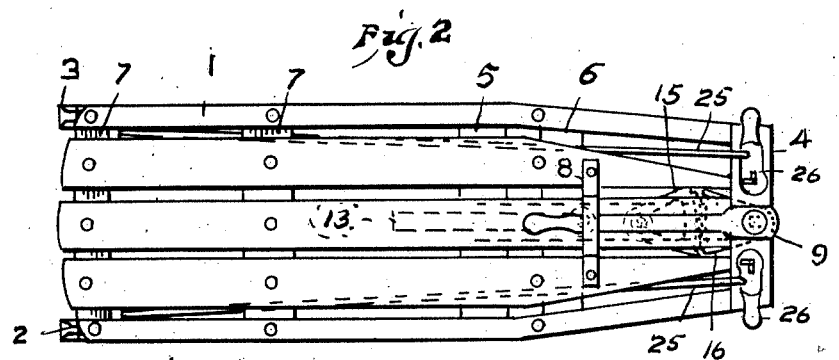
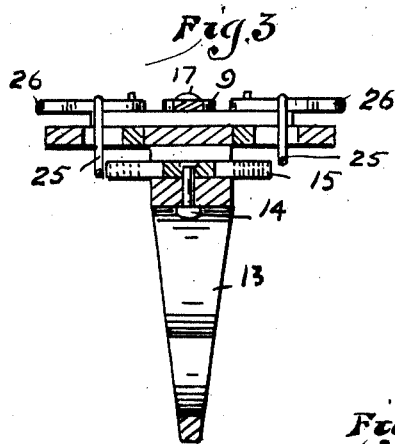
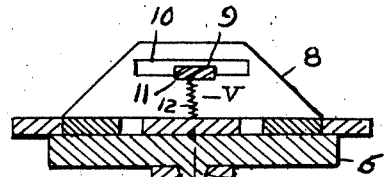
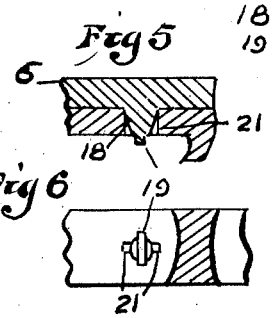
WITNESS
R. F. Dilworth
INVENTOR
Wilmer H. Yerkes
By Jack R. Snyder
Attorney

UNITED STATES PATENT OFFICE.

WILMER H. YERKES, OF PITTSBURGH, PENNSYLVANIA.

SLED.

1,349,645.  Specification of Letters Patent.  Patented Aug. 17, 1920.

Application filed May 22, 1920. Serial No. 383,391.

*To all whom it may concern:*

Be it known that I, WILMER H. YERKES, a citizen of the United States, residing at Pittsburgh, in the county of Allegheny and State of Pennsylvania, have invented certain new and useful Improvements in Sleds, of which the following is a specification.

This invention relates to sleds, and has for its object to provide a sled with a front runner, and further with means, in a manner as hereinafter set forth, for steering the front runner quickly and in a satisfactory manner.

A further object of the invention is to provide a sled, in a manner as hereinafter set forth, with braking elements conveniently operated from the forward end of the sled for quickly arresting movement of the latter when desired.

A further object of the invention is to provide a sled having a body portion and a front runner, said body portion and front runner having, in a manner as hereinafter set forth, associated means whereby the runner is pivotally connected with the body portion. The said pivotal connection being a detachable one, or rather whereby the runner and body portion are detachably connected.

Further objects of the invention are to provide a sled which is simple in its construction and arrangement, strong, durable, having an efficient and conveniently operated steering mechanism, readily set up, and comparatively inexpensive.

With the foregoing and other objects in view the invention consists of the novel construction, combination and arrangement of parts as hereinafter set forth, and illustrated in the accompanying drawings, wherein is shown an embodiment of the invention, but it is to be understood that changes, variations and modifications can be resorted to which come within the scope of the claim hereunto appended.

In the drawings wherein like reference characters denote corresponding parts throughout the several views:—

Figure 1 is a side elevation of the sled.
Fig. 2 is a top plan view.
Fig. 3 is a section on line III—III Fig. 1.
Fig. 4 is a section on line IV—IV Fig. 1.
Fig. 5 is a section on line V—V Fig. 4.
Fig. 6 is an inverted view of Fig. 5.

Referring to the drawings in detail 1 denotes body portion of the sled and to which is secured a pair of rear runners 2, 3. The body portion of the sled is formed from a series of slats connected together by transverse members 4, 5, 6 and 7. The forward part of the body portion 1 has secured thereto a vertically disposed bracket 8, which forms what may be termed a guide member for a steering lever 9, the latter is supported by the bracket 8 and which also limits the movement of the lever 9 in either direction. The bracket 8 is formed with an elongated slot 10, having the bottom wall thereof notched, as at 11, to provide a seat for the lever 9, and which acts as a means to maintain the lever 9 straight with respect to the body portion, and further prevents shifting of the lever until the latter is moved off its seat manually. A spring 12 is connected to the lever and to the body portion for the purpose of holding the lever on the seat formed by the notch 11. The lever 9 extends forwardly through the slot 10 to the forward end of the body portion 1.

Arranged forwardly of the body portion, as well as centrally thereof and beneath the same, is the front or steering runner 13, on top of which is fixedly secured, as at 14, a flat quadrant 15, which is toothed, and meshes with a toothed quadrant 16, positioned below the body portion 1, and is carried on and fixed to the lower end of a pivot 17, which depends from the forward end of the lever 9. The rod 17 extends down through the member 4.

The runner 13, is detachably and pivotally connected with the body portion 1, by a depending tapering plug 18 formed on its lower portion with a pair of oppositely disposed lateral lugs 19. The plug 18 is extended through a socket 20, formed in the top of the runner 13. The wall of the socket 20 is formed with opposed grooves 21 for the passage of the lugs 19, and after the lugs have been extended through the grooves 21, the plug is given a half turn whereby the plug is detachably and pivotally connected to the runner. The plug 18 is carried by the member 6. When setting up the runner 13 with respect to the body portion, preferably after the plug 18 is inserted in the socket 20, the runner 13 is shifted so that the lugs 19, will be clear of the lower ends of the grooves 21, whereby the lugs will be positioned below the member 6 which will arrest any upward movement of the plug.

By the arrangement set forth it is obvious that if the lever 9 is shifted the quadrant gears meshing with each other will cause the shifting of the runner 13, due to the pivotal connection between the runner 13 and the body portion and the fact that the quadrant 15 is fixed to the runner 13.

The runners 2, 3, at the rear thereof support a rod 22, on which is pivotally supported a pair of brake shoes 23, which are normally maintained in inoperative position by springs 24, fixed to the shoes and to the runners. The brake shoes are shifted to operative position by pulling rods 25, attached at their rear ends to the brake shoes and at their forward ends to lever arms 26 pivotally supported on the member 4, the latter also forms a foor rest. The levers arms 26 can be operated by hand or foot.

The runners 2, 3 and 13 are preferably constructed entirely of metal and in one piece. The runners 2, 3 do not extend the entire length of the body portion 1, but the forward portions of the runners 2, 3 oppose the rear portion of the runner 13.

What I claim is:

A sled comprising a body portion, a front runner, means for detachably connecting said runner with the body portion, said means providing a pivot for the runner and including a plug and a socket for the plug, said plug having lateral lugs and said socket having its wall grooved, means below the body portion for shifting the runner, and a lever above the body portion for actuating said shifting means.

In testimony whereof I affix my signature.

WILMER H. YERKES.